United States Patent Office 2,798,059
Patented July 2, 1957

2,798,059

COMPOSITIONS COMPRISING AN ACRYLONITRILE POLYMER AND AN N-(2-CYANOETHYL)ACRYLAMIDE

David C. Guth, Norwalk, and Edward J. Kerle, South Norwalk, Conn., assignors to American Cyanamid Company, New York, N. Y., a corporation of Maine No Drawing. Application March 21, 1956, Serial No. 572,831

13 Claims. (Cl. 260—32.6)

This invention relates to new and useful compositions of matter and more particularly to compositions comprising (1) an acrylonitrile polymerization product and (2) at least one member of the class consisting of N-2-cyanoethylacrylamide and N,N-bis(2-cyanoethyl)acrylamide. The N-2-cyanoethylacrylamides used in practicing the present invention may be represented by the general formula I 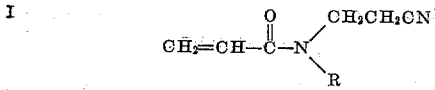

where R represents a member of the class consisting of hydrogen and the grouping —CH₂CH₂CN. When R represents hydrogen the compound is N-2-cyanoethylacrylamide, II 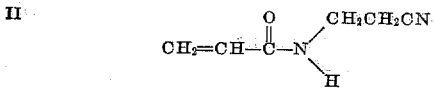

and when R represents the grouping —CH₂CH₂CN, the compound is N,N-bis(2-cyanoethyl)acrylamide, III 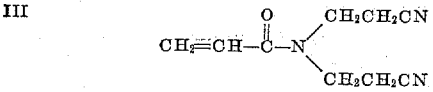

Instead of using a single N-2-cyanoethylacrylamide in practicing the present invention we may use mixtures thereof in any proportions. Hence, the N-substituted acrylamide employed in practicing our invention properly may be described as being at least one member of the class consisting of N-2-cyanoethylacrylamide and N,N-bis(2-cyanoethyl)acrylamide.

The compositions of this invention in which an N-substituted acrylamide of the kind embraced by Formula I is employed primarily as a solvent for the acrylonitrile polymerization product, in which case it constitutes a major proportion (more than 50%), e. g., from 55 to 98% or more, by weight of the composition, are particularly useful in the production of shaped articles therefrom, e. g., filaments, films, threads, rods, tubes and the like. An N-substituted acrylamide of the kind with which this invention is concerned also may be used primarily as a plasticizer for an acrylonitrile polymerization product, in which case it usually constitutes a minor proportion (less than 50%), e. g., from 0.5 to 45%, generally from 1 to 35 or 40% by weight of the composition.

Various methods of producing filaments, films and other shaped articles from polyacrylonitrile (polymeric acrylonitrile) and from copolymers or interpolymers of a major proportion of acrylonitrile and a minor proportion of another monomer or monomers, e. g., a polymerization product containing in the polymer molecules an average of at least 75% by weight of combined acrylonitrile, heretofore have been suggested. For example, in Rein U. S. Patent No. 2,117,210 dated May 10, 1938, it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U. S. Patent No. 2,140,921 dated December 20, 1938, it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc. Other solvents for a polymer of acrylonitrile are disclosed in many other patents, e. g., Latham U. S. Patent No. 2,404,714; Rogers U. S. Patents 2,404,715 and 2,404,725; Hansley U. S. Patent No. 2,404,716; Houtz U. S. Patents 2,404,717–2,404,722; Merner U. S. Patent No. 2,404,723; Houtz U. S. Patent No. 2,404,724 and Patent No. 2,404,727; Charch U. S. Patent No. 2,404,726, all dated July 23, 1946; Cresswell U. S. Patent No. 2,517,544 dated August 8, 1950; Kropa and Thomas U. S. Patent No. 2,520,150 dated August 29, 1950; Dalton U. S. Patents 2,588,334 and 2,588,335 dated March 11, 1952; and Cresswell U. S. Patent No. 2,676,161 dated April 20, 1954.

The present invention is based on our discovery that polymers and copolymers of acrylonitrile, more particularly homopolymeric acrylonitrile and thermoplastic copolymers of acrylonitrile, specifically such copolymers containing in their molecules an average of at least 75% by weight of combined acrylonitrile, e. g., copolymers of, by weight, from 75 to 99.5% of acrylonitrile and another monomer such, for instance, as vinyl acetate, methyl acrylate, ethyl acrylate, acrylamide, etc., are compatible with an N-substituted acrylamide of the kind embraced by Formula I and that such substituted acrylamides (or mixtures thereof) are capable of dissolving the acrylonitrile polymerization product to yield solutions which are suitable for use in making a wide variety of shaped or fabricated articles, including mono- and multifilaments, threads, yarns, bars, films, etc., therefrom. The invention is based on our further discovery that the aforementioned N-cyanoethylacrylamides or mixture thereof are able effectively to plasticize acrylonitrile polymerization products, so that the latter more easily can be shaped, as by extrusion or molding, into useful articles of manufacture. The N-substituted acrylamides employed in practicing our invention may be used either as a fugitive or temporary plasticizer, that is, a plasticizer which subsequently is removed from the polymerization product, or as a permanent plasticizer which is permitted to remain in the shaped polymer or copolymer.

N,N-bis(2-cyanoethyl)acrylamide and N-2-cyanoethylacrylamide are each believed to be new chemical compounds. These compounds, homopolymers thereof and their copolymers with other copolymerizable monomers, as well as method features, are disclosed and claimed in the copending application of David C. Guth and Walter H. Schuller, Serial No. 572,830, filed concurrently herewith. Methods of preparing the monomers, as described in the aforesaid Guth and Schuller copending application, are as follows:

PREPARATION OF N,N-BIS(2-CYANOETHYL) ACRYLAMIDE

The reactor comprised a 700 ml. glass vessel 4½ inches in diameter, 7 inches high, having a dome cover and provided 4 inches from the bottom with an outlet spout having an inside diameter of ¾ inch. The dome cover was equipped with a stirrer, thermometer, monomer and catalyst feed lines, and a reflux condenser. The reactor was immersed in a large, constant-temperature bath filled with glycerine. The monomer solution was metered into the reactor by a gear pump. The catalyst-feeding device was a glass, piston-displacement feeder operated by a clock motor.

The monomer solution consisted of a 15:85 weight ratio of acrylamide dissolved in acrylonitrile. The catalyst solution consisted of a 0.5 N solution of sodium methylate in methanol. The acrylonitrile contained 0.57% by weight of water which was present as a stabilizer. The run was started by introducing the monomer solution at 2180 ml./hour and the catalyst solution at 73 ml./hour into the empty reactor, with the bath temperature at 45° C. The temperature of the reaction was maintained at 45° C. throughout the run. One hundred and seventy (170) minutes after the start of the run equilibrium conditions were considered to have been otained and the equilibrium product (hereafter for brevity designed as "EP") was then collected for a total of 70 minutes. The EP was collected in 32-ounce bottles, each of which contained 100 ml. of 0.33 N acetic acid. The acid mixture was stirred during the collection of product. The pH of the acid-EP mixture was 4–4.5 throughout.

The EP from all of the 32-ounce bottle was combined, the organic layer separated from the aqueous acid layer, and the organic layer washed twice with 500 ml. portions of 0.1 N hydrochloric acid, and the washed with four 400 ml. portions of water. The washed acrylonitrile solution of the desired product, N,N-bis(2-cyanoethyl) acrylamide, was dried with sodium sulfate. The drying agent was filtered off and filtrated concerted under reduced pressure. An aliquot was worked up and the yield of N,N-bis(2-cyanoethyl)acrylamide determined for the aliquot. The percentage yield of this monomer in the EP (based on amount of acrylamide used) was 40%. The work-up of the aliquot involved dissolution in acetone and precipitation, by the addition of methanol, of a yellow, solid, base-initiated copolymer of acrylonitrile and acrylamide (established by getting an infrared nitrile-amide molar ratio). The precipitate was filtered and a small quantity of ethyl ether added. Homopoly-N,N-bis(2-cyanoethyl)acrylamide precipitated out and was removed by filtration. Finally, an excess of ethyl ether was added to the filtrate, and N,N-bis(2-cyanoethyl)acrylamide was obtained as a pale yellow, waxy solid. This was filtered, dried, and weighed.

The combined acetic acid layers, hydrochloric acid washings, and water rinses were extracted repeatedly with acrylonitrile, the combined extracts dried with sodium sulfate, filtered, and stripped under reduced pressure. The residue was treated with an excess of ethyl ether, and the resulting white, waxy solid was collected by filtration and dried. The yield of N,N-bis(2-cyanoethyl)acrylamide obtained from this fraction was equivalent to 14.5% of the theoretical. The total yield of monomer was, therefore, 54.5% based on the amount of acrylamide used.

A portion of the crude monomer was recrystallized from an acrylonitrile-ether mixture to a constant M. P. of 66.5° C.

*Analyses.*—Calculated for $C_9H_{11}N_3O$: C, 61.01; H, 6.22; N, 23.7. Found: C, 60.94; H, 6.30; N, 23.78.

Infrared examination confirmed the structure as being that of N,N-bis(2-cyanoethyl)acrylamide. It is soluble in dimethylformamide, acrylonitrile and hot benzene, but is insoluble in water, heptane, hexane, ethyl ether and cold benzene.

PREPARATION OF N-2-CYANOETHYL-ACRYLAMIDE

A sample of N-N-bis(2-cyanoethyl)acrylamide, prepared as described above, was distilled under reduced pressure. At 150° C. and 1.9 mm. pressure about one-third of the material distilled over. The remainder of the material polymerized in the distilling pot. An infrared curve indicated the fluid, colorless distillate to be N-2-cyanoethylacrylamide, which was further established by the following nitrogen analysis:

Calculated for $C_6H_8N_2O$: N, 22.6. Found: N, 22.3.

N-2-cyanoethylacrylamide is soluble in dimethylformamide and other solvents in which N,N-bis(2-cryanoethyl)acrylamide is soluble.

Polymeric (homopolymeric) acrylonitrile and acrylonitrile copolymers (thermoplastic acrylonitrile copolymers) containing in the polymer molecules an average of at least 75% by weight of combined acrylonitrile are employed in carrying the present invention into effect. These polymers and copolymers are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 75% by weight of combined acrylonitrile. The expression "polymerization product containing in the polymer molecules an average of at least 75% by weight of combined acrylonitrile," as used herein and in the appended claims, means a polymerization product (polymer, copolymer or interpolymer or mixtures thereof) containing in its molecules an average of at least 75% by weight of the acrylonitrile unit, which is considered to be present in the individual polymer molecule at the group

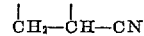

or, otherwise stated, at least 75% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 75% by weight of combined acrylonitrile are compounds containing a single $CH_2=C<$ grouping, for instance, the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, ethallyl alcohol, etc.; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least 75% by weight of combined acrylonitrile. Thus, when the polymerization rate of the monomers present in the polymerizable mixture is substantially the same, the proportions may be, for example, from, by weight, about 75% to about 99% of acrylonitrile to from about 25% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50% by weight thereof in order to obtain a polymerization product containing in the copolymer molecules an average of at least 75% by weight of acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054 dated May 30, 1939, Jacobson U. S. Patent No. 2,436,926 dated March 2, 1948, and others. The polymeric and copolymeric acrylonitriles used in preaticing our invention may be of any suitable molecular weight, but ordinarily the molecular weight (average molecular weight) is within the range of 40,000 to 200,000 or higher, and advantageously is of the order of 50,000 to 100,000, e. g. about 70,000–75,000, as calculated from a viscosity measurement of the polymer in dimethyl formamide using the Staudinger equation (reference: U. S. Patent No. 2,404,713).

The dissolution of the acrylonitrile polymerization product in the N-cyanoethylacrylamide (or mixture of the mono- and di-substituted compounds) is accelerated by using a polymer or copolymer which is in finely divided state, e. g., one which, if not in finely divided state as originally formed, has been ground so that all or substantially all of it will pass through a U. S. Standard Sieve Series No. 50 screen. It also is usually desirable to agitate the mass, as by mechanical stirring, while dissolving the polymerization product in the solvent. To avoid or minimize discoloration of the polymeric or copolymeric acrylonitrile, it is generally advantageous to employ the lowest temperature in effecting dissolution or plasticization of the acrylonitrile polymerization product, which temperature is consistent with practical considerations, e. g., the time required for effecting solution, etc.

The proportions of the acrylonitrile polymerization product and the N-cyanoethylacrylamide in the compositions of our invention may be varied widely, depending mainly upon the particular use for which the composition is intended. If the aforesaid N-substituted acrylamide is employed primarily as a solvent for the polymer or copolymer so as to obtain a film, filament, thread, yarn, rod, tube or other shaped article from which all or substantially all of the solvent subsequently is removed, then the acrylonitrile polymerization product usually constitutes at least 2%, e. g., at least 4 or 5% but less than 50%, e. g., from 5% to about 25 or 30%, by weight, of the composition. Advantageously, in most cases, when the solution is to be used in the spinning of filaments (mono- or multifilaments) or the casting of films, the polymer or copolymer constitutes at least 7 or 8%, e. g., from 10 to 15 or 20%, by weight of the solution.

The aforementioned ranges of proportions are mentioned as indicative of proportions that may be employed in forming solutions of the polymerization product, and our invention obviously is not limited to the use of only such proportions. Especially in spinning and casting applications of the compositions, the important factor is that the proportions be such that the viscosity of the composition at the operating temperature is within a workable range. Satisfactory viscosities at the usual operating temperatures generally prevail when the polymer or copolymer constitutes between about 5% and about 20% by weight of the composition, but this also is dependent upon the average molecular weight of the polymerization product. By using special extrusion methods, concentrations of polymer substantially above 20% can be employed satisfactorily. Because the use of the higher amounts of solvent renders spinning operations more costly and difficult due to the trouble often encountered in rapidly removing large amounts of solvent from the solution and due to the cost of such removal, even though the solvent be recovered, it is preferable to use an acrylonitrile polymerization product having a molecular weight such that a maximum amount of the polymer or copolymer, consistent with the viscosity of the solution at the operating temperature, can be dissolved in the N-cyanoethylacrylamide.

The solutions described above may be used in the production of various fabricated structures such, for example, as films, filaments, bars, rods, tubes, etc., in accordance with general techniques and using apparatus now generally known to those skilled in the art, the detailed operating conditions being suitably modified where required. Reference is made to the afore-mentioned patents for both general and somewhat more specific descriptions of practices and apparatus employed.

In the production of filamentary material which shows orientation along its longitudinal axis, the originally formed product (from which much, if not substantially all, of the solvent usually has been extracted or evaporated) is stretched by suitable means to effect the desired orientation. This increases the tensile strength and otherwise improves the properties of the filamentary material. Orientation may be effected by stretching the thread or strand at any suitable stage of the spinning operation. Advantageously, in some cases, spun filament or thread is stretched while it still contains at least some of the solvent. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause at least appreciable orientation of the molecules and an improvement in the properties of the material undergoing treatment. The amount of tension to which the strand is subjected obviously should not be so great as to cause it to break. Depending, for example, upon the type or kind of material being stretched and the particular properties desired in the finished product, the amount of stretch may vary, for instance, from 100%, preferably from 200 or 300%, up to 1000% or more of the original length of the filament or strand. The stretch may be applied gradually by passing the thread over a plurality of godets having increasing peripheral speeds. The stretched thread may be wound upon a spool or it may be collected in a centrifugal pot, whereby twist advantageously is applied to the thread. Alternatively, the stretched thread may be led over a thread-storage device on which it may be treated with a suitable solvent to remove all or part of the liquid coagulant (if employed) and/or the N-cyanoethylacrylamide substance, after which it may be continuously dried, oiled and taken up on a twisting device such, for instance, as a ring twisting spindle.

The extruded filament or thread may be given part or all of its total stretch while it is being passed through a gaseous medium, e. g., air, nitrogen, flue gases, etc., or through a liquid medium, e. g., hot benzene, acetone, methylene chloride, or other gaseous or liquid medium as may have been employed for extracting the solvent from the solution of the acrylonitrile polymerization product. To obviate or minimize discoloration of the polymerization product, the temperature of the medium in which the polymer or copolymer is stretched and the rate of travel of the strand through the medium should be so adjusted that overheating of the strand does not occur.

The highly stretched product is strong, tough and pliable, and shows a high degree of orientation along its longitudinal axis by X-ray diffraction.

The solvent solutions of the acrylonitrile polymerization product also can be cast in the form of films. For instance, a dimethylformamide solution of the acrylonitrile polymer modified with the N-cyanoethylacrylamide may be cast upon a revolving drum which is partly immersed in a coagulating bath of, for example, water, cold benzene, etc., which will extract the dimethylformamide and serve to deposit the acrylonitrile polymerization product as a thin film on the drum as it passes through the bath. The resulting film may be stretched, if desired, lengthwise and crosswise by suitable apparatus to improve its properties. Alternatively, solutions of the acrylonitrile polymer in N-2-cyanoethylacrylamide may be evaporated in a gaseous atmosphere to form films which may be similarly stretched to improve their properties.

It will be understood, of course, by those skilled in the art that the temperature of the liquid or gaseous extractive medium should be such as to dissolve or to volatilize the solvent from the extruded mass most rapidly and effectively. The length of travel of the shaped article through the zone or medium in which this is effected may be varied as desired or as conditions may require, but in all cases should be sufficiently long to effect solidification of the polymerization product and to extract from the extruded mass substantially all of the solvent or, if desired, only a part of it, leaving the remainder, e. g., from 0.5 or 1% to 15 or 20% or more, by weight of the whole, in the extruded mass so that it may function as a plasticizer for the polymerization product.

Compositions comprising, by weight, from about 5 or 10% to about 35 or 40% of an N-cyanoethylacrylamide of the kind embraced by Formula I and the remainder an acrylonitrile polymerization product containing in the molecules thereof an average of at least 75% by weight of combined acrylonitrile also may be employed as a dielectric or as a component of a dielectric in an electric capacitor. The N-cyanoethylacrylamide-plasticized acrylonitrile polymerization product also can be combined with paper, fabrics comprising fibers of an acrylonitrile polymerization product and other dielectrics.

In order that those skilled in the art better may understand how the present invention can be carried into effect, the following examples are given by way of illustration and not by way of limitation. All parts are by weight.

*Example 1*

Five (5) parts of polyacrylonitrile (homopolymeric acrylonitrile), about 5 to 30 microns in particle size and having an average molecular weight of about 30,000, is mixed in a glass vessel with 95 parts of solid N,N-bis(2-cyanoethyl)acrylamide, and the mixture is heated with stirring over a low flame to about 100° C. A clear, light yellow, fluid solution is obtained which becomes viscous on cooling but from which no particles of polyacrylonitrile separate even on standing at room temperature (about 25° C.).

*Example 2*

Same as in Example 1 with the exception that, instead of 5 parts of homopolymeric acrylonitrile, there is used 5 parts of an acrylonitrile copolymer produced by polymerizing a mixture of 95 parts acrylonitrile and 5 parts methyl acrylate. The resulting solution is clear when the temperature has been raised to about 100° C., and no particles of acrylonitrile copolymer separate upon cooling to room temperature.

*Example 3*

Same as in Example 1 with the exception that, instead of 5 parts of homopolymeric acrylonitrile, there is used 2 parts of an acrylonitrile copolymer produced by polymerizing a mixture of 90 parts acrylonitrile and 10 parts acrylamide, and 98 parts of N-2-cyanoethylacrylamide instead of 95 parts of N,N-bis(2-cyanoethyl)acrylamide. The resulting solution is clear when the temperature has been raised to a little over 90° C., and no particles of acrylonitrile copolymer separate upon cooling to room temperature.

*Example 4*

Same as in Example 1 with the exception that, instead of 5 parts of homopolymeric acrylonitrile, there is used 1 part of an acrylonitrile copolymer produced by polymerizing a mixture of 95 parts acrylonitrile and 5 parts 2-methyl-5-vinylpyridine, and 99 parts of N,N-bis(2-cyanoethyl)acrylamide. The resulting solution is clear when the temperature has been raised to a little over 100° C., and no particles of acrylonitrile copolymer separate upon cooling to room temperature.

*Example 5*

Same as in Example 1 with the exception that, instead of 5 parts of homopolymeric acrylonitrile, there is used 3 parts of an acrylonitrile copolymer produced by polymerizing a mixture of 80 parts acrylonitrile and 20 parts vinyl acetate, and 97 parts of N-2-cyanoethylacrylamide instead of 95 parts of N,N-bis(2-cyanoethyl)acrylamide. The resulting solution is clear when the temperature has been raised to about 95° C., and no particles of acrylonitrile copolymer separate upon cooling to room temperature.

*Example 6*

Fifty (50) parts of N,N-bis(2-cyanoethyl)acrylamide and 200 parts of finely divided polyacrylonitrile (homopolymeric acrylonitrile) are blended together to yield a homogeneous composition by rolling in a ball mill for 30 hours. This composition can be molded into various shaped articles, e. g., disks, bars, etc., under heat and pressure, for instance at 160°–190° C. and under a pressure of from 6000 to 8000 pounds per square inch.

*Example 7*

A mixture of 5 parts of finely divided homopolymeric acrylonitrile, having an average molecular weight of about 75,000, and 95 parts of N,N-bis(2-cyanoethyl)-acrylamide is heated to 105° C., yielding a clear spinning solution. This solution is filtered and deaerated under vacuum. The resulting solution heated to about 75° C. is extruded through a spinnerette into a coagulating bath of benzene maintained at about 75° C., thereby to form a filament or thread of polymeric acrylonitrile. This filament is then stretched to cause orientation along the fiber axis in the manner hereinbefore described.

*Example 8*

A filament or fiber produced from N,N-bis(2-cyanoethyl)acrylamide and homopolymeric acrylonitrile in the manner described under Example 7 and which contains a small amount of the order of 3% of residual N,N-bis(2-cyanoethyl)acrylamide is stretched about 500% to orient the molecules along the fiber axis, yielding a plasticized oriented filament of polyacrylonitrile.

*Example 9*

Same as in Example 7 with the exception that the spinning solution contains 5 parts of an acrylonitrile-vinyl acetate-2-methyl-5-vinylpyridine copolymer, produced by copolymerization in aqueous solution of about 85 parts acrylonitrile, about 5 parts vinyl acetate and about 5 parts of 2-methyl-5-vinylpyridine, instead of 5 parts of homopolymeric acrylonitrile. Similar results are obtained.

*Example 10*

Thirty percent by weight, based on the amount of polyacrylonitrile, of N,N-bis(2-cyanoethyl)acrylamide is added to a 10% solution of polyacrylonitrile in dimethylformamide. A film is cast on glass with the above solution. The film is dried to evaporate the dimethylformamide, and then peeled from the plate. When subjected to a pull between the fingers this film shows an ability to stretch considerably before tearing, a feature not present in films cast from a 10% solution of polyacrylonitrile alone. This shows the plasticizing effect of the N,N-bis-(2-cyanoethyl)acrylamide upon the polyacrylonitrile.

Plasticization of homopolymeric acrylonitrile similar to that described above likewise is obtained when 30%, by weight of the polyacrylonitrile, of N-2-cyanoethylacrylamide or, for example, a 50–50 mixture of N-2-cyanoethylacrylamide and N,N-bis(2-cyanoethyl)acrylamide is substituted for the same amount of N,N-bis(2-cyanoethyl)acrylamide and used in identically the same manner described in the preceding paragraph.

*Example 11*

Six (6) parts of a copolymer of about 90% acrylonitrile and 10% vinyl acetate, ground to a particle size of about 5 to 30 microns and having an average molecular weight of about 70,000, is mixed in a glass vessel with 37 parts N-2-cyanoethylacrylamide and 37 parts N,N-bis)2-cyanoethyl)acrylamide, and is heated with stirring over a low flame to about 100° C. A clear, light yellow, fluid solution is obtained. This solution becomes viscous on cooling but no particles of acrylonitrile copolymer separate therefrom even on standing at room temperature.

It will be understood, of course, by those skilled in the art that our invention is not limited to the specific proportions of ingredients, operating conditions and procedures given in the above illustrative examples. Likewise, polymerization products other than those given in the examples may be used. For instance, instead of the particular copolymers of acrylonitrile employed in certain of the examples, we may use such copolymers in which the acrylonitrile is present in the copolymer molecules in other proportions within the range of, for example, an average of 75% to 99% or more by weight, or other copolymers of acrylonitrile and another monomer, numerous examples of which have been given hereinbefore, and in which the acrylonitrile constitutes at least 75% by weight of the copolymer molecule.

From the foregoing description it will be seen that the present invention provides compositions comprising an acrylonitrile polymerization product (polymer, copolymer or interpolymer) and an N-cyanoethylacrylamide of the kind embraced by Formula I as a plasticizer or as a solvent therefor. These compositions can be shaped or fabricated, as by extrusion, molding, casting, etc., into a wide variety of useful articles. Lubricants, antistatic agents and other conventional modifiers of acrylonitrile polymerization products can be incorporated therein at any suitable stage of the operation. Although not limited thereto, the compositions of this invention are particularly useful in the production of filaments, threads, yarns, etc., which thereafter are woven into fabrics, and also as capacitor dielectrics and in other applications of dielectrics. Other uses includes those given in the patents mentioned in the early part of this specification.

We claim:

1. A composition of matter comprising (1) a polymerization product containing in the polymer molecules an average of at least 75% by weight of combined acrylonitrile and (2) at least one member of the class consisting of N-2-cyanoethylacrylamide and N,N-bis(2-cyanoethyl)acrylamide.

2. A composition as in claim 1 wherein the polymerization product is homopolymeric acrylonitrile.

3. A composition as in claim 1 wherein the polymerization product is a copolymer of copolymerizable ingredients including acrylonitrile and vinyl acetate, the said copolymer containing in the molecules thereof an average of at least 75% by weight of combined acrylonitrile.

4. A composition as in claim 1 wherein the polymerization product is a copolymer of copolymerizable ingredients including acrylonitrile and methyl acrylate, the said copolymer containing in the molecules thereof an average of at least 75% by weight of combined acrylonitrile.

5. A composition as in claim 1 wherein the polymerization product of (1) constitutes at least 2% by weight of the composition.

6. A composition of matter comprising (1) a polymerization product containing in the polymer molecules an average of at least 75% by weight of combined acrylonitrile and (2) N-2-cyanoethylacrylamide.

7. A composition of matter comprising (1) a polymerization product containing in the polymer molecules an average of at least 75% by weight of combined acrylonitrile and (2) N,N-bis(2-cyanoethyl)acrylamide.

8. A composition of matter comprising (1) a polymerization product containing in the polymer molecules an average of at least 75% by weight of combined acrylonitrile and (2) N-2-cyanoethylacrylamide, the polymerization product of (1) constituting from about 5% to about 30%, by weight, of the total amount of (1) and (2).

9. A composition of matter comprising (1) a polymerization product containing in the polymer molecules an average of at least 75% by weight of combined acrylonitrile and (2) N,N-bis(2-cyanoethyl)acrylamide, the polymerization product of (1) constituting from about 5% to about 30%, by weight, of the total amount of (1) and (2).

10. A plasticized composition comprising a polymerization product containing in the polymer molecules an average of at least 75% by weight of combined acrylonitrile, said polymerization product being plasticized with a plasticizing amount not substantially exceeding 40% by weight of the composition of a plasticizer comprising at least one member of the class consisting of N-2-cyanoethylacrylamide and N,N-bis(2-cyanoethyl)acrylamide.

11. A composition comprising a plasticized polymerization product containing in the polymer molecules an average of at least 75% by weight of combined acrylonitrile, said polymerization product being plasticized with from about 1% to about 35% by weight of the whole of N-2-cyanoethylacrylamide.

12. A composition comprising a plasticized polymerization product containing in the polymer molecules an average of at least 75% by weight of combined acrylonitrile, said polymerization product being plasticized with from about 1% to about 35% by weight of the whole of N,N-bis(2-cyanoethyl)acrylamide.

13. A filamentary material which shows orientation along its longitudinal axis and which comprises a polymerization product containing in the polymer molecules an average of at least 75% by weight of combined acrylonitrile, said polymerization product being plasticized with from about 1% to about 20% by weight of the whole of at least one member of the class consisting of N-2-cyanoethylacrylamide and N,N-bis(2-cyanoethyl)acrylamide.

No references cited.

UNITED STATES PATENT OFFICE

CERTIFICATE OF CORRECTION

Patent No. 2,798,059                      July 2, 1957

David C. Guth et al.

It is hereby certified that error appears in the printed specification of the above numbered patent requiring correction and that the said Letters Patent should read as corrected below.

Column 3, line 16, for "otained" read -- obtained --; line 17, for "designed" read -- designated --; line 23, for "bottle" read -- bottles --; line 26, for "the washed" read -- then washed --; line 30, for "and filtrated concerted" read -- and the filtrate concentrated --; column 4, line 5, for "N,N-bis(2-cryano-" read -- N,N-bis(2-cyano- --; line 31, for "molecule at" read -- molecule as --; line 58, for "$CH_2\text{-}C{<}$" read -- $CH_2{=}C{<}$ --; column 5, line 21, for "prcaticing" read -- practicing --; line 41, for "lowest temperature" read -- lowest possible temperature --; column 9, line 20, for "bis)2-" read -- bis(2- --; line 55, for "includes" read -- include --.

Signed and sealed this 27th day of August 1957.

(SEAL)
Attest:
KARL H. AXLINE
Attesting Officer

ROBERT C. WATSON
Commissioner of Patents